(12) United States Patent
Maikawa et al.

(10) Patent No.: US 9,969,280 B2
(45) Date of Patent: May 15, 2018

(54) CONTACTLESS ELECTRICITY SUPPLY DEVICE

(75) Inventors: Kengo Maikawa, Kawasaki (JP); Hiroshi Tanaka, Atsugi (JP); Tomoya Imazu, Yokohama (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 174 days.

(21) Appl. No.: 14/119,536

(22) PCT Filed: May 23, 2012

(86) PCT No.: PCT/JP2012/063142
§ 371 (c)(1),
(2), (4) Date: Nov. 22, 2013

(87) PCT Pub. No.: WO2012/165242
PCT Pub. Date: Dec. 6, 2012

(65) Prior Publication Data
US 2014/0103871 A1    Apr. 17, 2014

(30) Foreign Application Priority Data

May 27, 2011    (JP) .................................. 2011-118678

(51) Int. Cl.
*B60L 11/18*    (2006.01)
*H02J 50/10*    (2016.01)
*H02J 7/02*    (2016.01)

(52) U.S. Cl.
CPC ............. *B60L 11/182* (2013.01); *H02J 7/025* (2013.01); *H02J 50/10* (2016.02); *Y02T 10/7005* (2013.01);
(Continued)

(58) Field of Classification Search
CPC .......................... B60L 11/182; B60L 11/1827; B60L 11/1829; B60L 11/1831; B60L 11/1833
See application file for complete search history.

(56) References Cited

U.S. PATENT DOCUMENTS 5,654,621 A    8/1997    Seelig
8,310,108 B2    11/2012    Inoue et al.
(Continued)

FOREIGN PATENT DOCUMENTS

DE        42 36 286 A1    5/1994
DE    10 2009 033 239 A1    1/2011
(Continued)

OTHER PUBLICATIONS

European Extended Search Report, dated Feb. 13, 2015, 5 pages.

*Primary Examiner* — Vuthe Siek
*Assistant Examiner* — Aric Lin
(74) *Attorney, Agent, or Firm* — Foley & Lardner LLP (57) ABSTRACT

A contactless electric power supply device 100 to charge a battery 28 of a vehicle includes a power transmitting circuit 101 having a power transmitting coil 12 and a charging circuit 201 having a power receiving coil 22. An electric power is transmitted from power transmitting coil 12 to power receiving coil 22 in a contactless manner. When the vehicle approaches power supply device 100, a trial power supply in which a electric power transmission through a minute electric power is carried out is executed and a power transmission efficiency from power transmitting coil 12 to power receiving coil 22 is estimated on a basis of a current flowing through power transmitting circuit 101. From this power transmission efficiency, a determination of whether power receiving coil 22 falls in a range in which battery 28 is chargeable with respect to power transmitting coil 12 is made.

6 Claims, 6 Drawing Sheets

(52) U.S. Cl.
CPC .......... *Y02T 10/7072* (2013.01); *Y02T 90/122* (2013.01); *Y02T 90/14* (2013.01)

(56) References Cited

U.S. PATENT DOCUMENTS

| | | |
|---|---|---|
| 8,565,930 B2 | 10/2013 | Miwa |
| 8,854,216 B2 | 10/2014 | Uchida |
| 2010/0244577 A1* | 9/2010 | Shimokawa .................. 307/104 |
| 2010/0244581 A1 | 9/2010 | Uchida |
| 2011/0095618 A1 | 4/2011 | Schatz et al. |
| 2011/0270462 A1* | 11/2011 | Amano et al. ................ 700/297 |
| 2012/0187773 A1 | 7/2012 | Wechlin et al. |

FOREIGN PATENT DOCUMENTS

| | | |
|---|---|---|
| EP | 0 788 212 A2 | 8/1997 |
| JP | 2009-284696 A | 12/2009 |
| JP | 2010-119246 A | 5/2010 |
| JP | 2010-183812 A | 8/2010 |
| WO | WO 2010/119577 A1 | 10/2010 |
| WO | 2010/137145 A1 | 12/2010 |
| WO | WO 2011/010375 A1 | 1/2011 |
| WO | WO 2011024285 A1 * | 3/2011 |

\* cited by examiner

CONTACTLESS ELECTRICITY SUPPLY DEVICE

TECHNICAL FIELD

The present invention relates to a contactless electric power supply device.

BACKGROUND ART

Such a charging system as will be described below is known. Namely, this charging system includes: power transmitting means; power receiving means for receiving an electric power from the power transmitting means in a contactless manner; efficiency detecting means for detecting a transmission efficiency between the power transmitting means and the power receiving means; determining means for determining whether the detected transmission efficiency is equal to or larger than a prescribed value; and control means for determining that a normal power supply is obstructed by means of an obstacle or so forth in a case where the transmission efficiency is below the prescribed value, for temporarily stopping the power transmission by means of the power transmitting means, and for restarting the power transmission through a minute electric power after a prescribed time (Patent Document 1).

However, since, in the above-described Patent Document 1, the transmission efficiency is calculated from the received electric power of the power receiving means, the transmission efficiency cannot be calculated in a case where an electric current of the power receiving means cannot be measured.

PRE-PUBLISHED DOCUMENT

Patent Document 1: Japanese Patent Application First Publication No. 2010-119246.

DISCLOSURE OF THE INVENTION

It is an object of the present invention to provide a contactless power supply device which is capable of estimating a power transmission efficiency from a power transmitting coil to a power receiving coil even in a state in which a power receiving circuit including the power receiving coil is not in an electric conduction state.

According to the present invention, on a basis of a detected value of a sensor measuring a current caused to flow through a power transmitting circuit or a voltage applied to the power transmitting circuit, the power transmission efficiency from a first coil to a second coil is estimated.

According to the present invention, the power transmission efficiency has a correlation to a distance between the first coil and the second coil and the detected value of the sensor is varied in accordance with the distance. Hence, the power transmission efficiency can be estimated from an output value of the sensor at a power transmitting side.

EMBODIMENTS FOR CARRYING OUT THE INVENTION

Hereinafter, preferred embodiments according to the present invention will be described on a basis of drawings.

Figure 1:
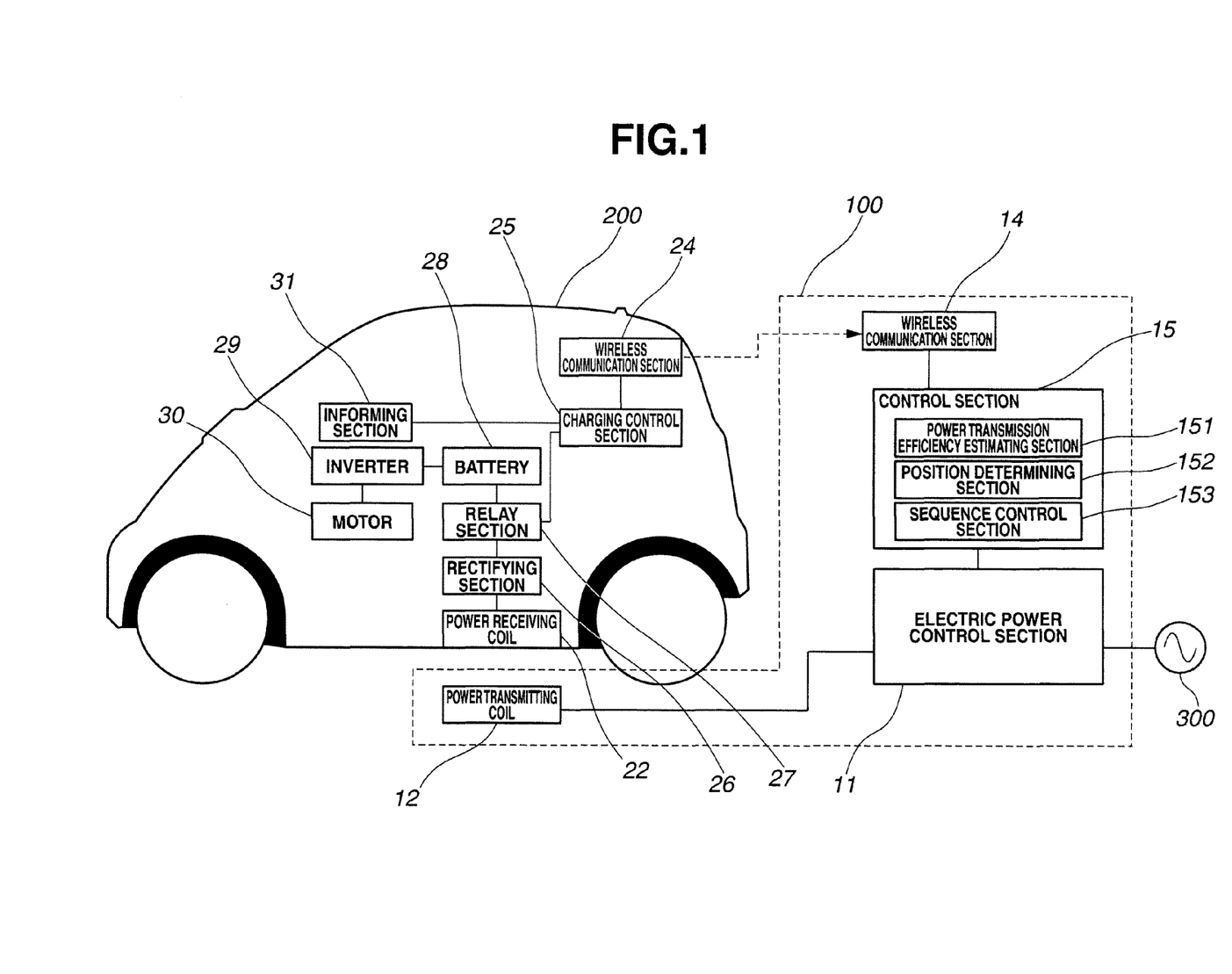
FIG. 1 is a block diagram of a contactless charging system related to a preferred embodiment according to the present invention.

FIG. 1 shows a block diagram of a contactless charging system in which a vehicle 200 and a power supply device 100 including a contactless power supply device in a preferred embodiment according to the present invention are equipped. It should be noted that a unit on a vehicle side of the contactless power supply device is mounted in an electric automotive vehicle but may be mounted in another vehicle such as a hybrid vehicle or so forth.

As shown in FIG. 1, the contactless charging system in this embodiment is a system including vehicle 200 having a unit on the vehicle side and power supply device 100 which is a unit on an earth side and, from the power supply device 100 installed on a power supply service station or so forth, the electric power is supplied in a contactless manner to charge a battery 28 installed in vehicle 200.

Power supply device 100 includes: an electric power control section 11; a power transmitting coil 12; a wireless communication section 14; and a control section 15. Power supply device 100 is disposed in a parking space to park vehicle 200 and is a unit on the earth side to supply an electrical power through a contactless power supply between coils when vehicle 200 is parked at a predetermined parking position.

Electric power control section 11 is a circuit to convert an alternating current electric power supplied from an alternating current electric power supply 300 to another alternating current electric power of a high frequency and to supply the converted alternating current electric power to power transmitting coil 12 and to control an electric power in order for the electric power set by a control section 15 to be outputted to power transmitting coil 12. A specific structure of electric power control section 11 will be described later.

Power transmitting coil 12 is a coil to supply the electric power in the contactless manner to power receiving coil 22 installed in vehicle side 200 and power transmitting coil 12 is connected to electric power control section 11 and is installed in the parking space in which the contactless power supply device in this embodiment is disposed.

When vehicle 200 is parked at the predetermined parking position, power transmitting coil 12 is positioned at a lower part of power receiving coil 22 with a distance to power receiving coil 22 maintained. Power transmitting coil 12 is a coil of circular shape parallel to a surface of the parking space.

Wireless communication section 14 is installed in power supply device 100 which is on the earth side to perform a bi-directional communication with a wireless communication section 24 disposed at vehicle side 200. A communication frequency higher than a frequency used in a vehicular peripheral equipment such as an intelligent key is set for the communication between wireless communication section 14 and wireless communication section 24. Therefore, even if the communications between wireless communication section 14 and wireless communication section 24 are carried out, the vehicular peripheral equipment is difficult to receive an interference due to the communications. For the communications between wireless communication section 14 and wireless communication section 24, for example, various types of wireless LAN systems have been used and a communication method has been used suitable for a remote distance.

Control section 15 is a part controlling a whole power supply device 100, includes: a power transmission efficiency estimating section 151; a position determining section 152; and a sequence control section 153, and controls electric power control section 11, power transmitting coil 12, and wireless communication section 14.

Control section 15 transmits a control signal to the effect that an electric power supply from power supply device 100 is to be started to vehicle side 200 and receives the control signal to the effect that the electric power is requested to be received from power supply device 100 from vehicle side 200.

Vehicle 200 includes: power receiving coil 22; wireless communication section 24; a charging control section 25; a rectifying section 26; a relay section 27; a battery 28; an inverter 29; a motor 30; and an informing section 31. Power receiving coil 22 is interposed between rear road wheels via a bottom surface (chassis) of vehicle 200. Then, when vehicle 200 is parked at the predetermined parking position, power receiving coil 22 is positioned at an upper part of power transmitting coil 12 and maintains a distance to power transmitting coil 12. Power receiving coil 22 is a circular shaped coil which is parallel to the surface of the parking space.

Rectifying section 26 is connected to power receiving coil 22 and is constituted by a rectifying circuit which rectifies the alternating current electric power received by power receiving coil 22 to a direct current power supply. Relay section 27 includes a relay switch which turns on or off according to a control of charging control section 25. Relay section 27 is connected to electrically separate between a drive train (series or system) circuit formed by battery 28, inverter 29, and motor 30 and a charging system circuit formed by power receiving coil 22 and rectifying section 26. Since the drive train circuit is a high power system circuit, a high safety is demanded when it is installed in vehicle 200. On the other hand, power receiving coil 26 included in the charging system circuit is installed on an outside of vehicle 200 in order to maintain the contactless state to the earth side. Therefore, relay section 27 is installed between a high power system circuit and a low power system circuit and, when vehicle is traveling, relay section 27 is turned off so that the safety of an electric system in vehicle 200 is increased.

Battery 28 is constituted by a plurality of secondary cells to provide an electric power source of vehicle 200. Inverter 29 is a control circuit such as a PWM control circuit or so forth having switching elements such as IGBTs or so forth and inverts a direct current electric power outputted from battery 28 to an alternating current electric power on a basis of switching control signals and to supply motor 30.

Motor 30 is constituted by, for example, a three-phase alternating current motor and provides a drive source for driving vehicle 200.

Informing section 31 is a device to inform the information through a sound, a light, a video image, or so forth to a user and is constituted by a speaker, LED light, a display of a navigation system, and so forth.

Charging control section 25 is a controller to control the charging of battery 28 and controls wireless communication section 24, relay section 27, and informing section 31. Charging control section 25 transmits a signal to the effect that the charging is to be started to control section 15 through the communication between wireless communication section 24 and wireless communication section 14. In addition, charging control section 25 is connected to a controller which controls a whole of vehicle 200 via a CAN communication network (not shown). This controller manages a switching control of inverter 28 and a charge state (SOC) of battery 22. Charging control section 15 transmits a signal to the effect that the charging is completed to control section 15 in a case where the controller has determined that battery 28 has reached to a full charge state on a basis of the SOC of battery 28.

In the contactless power supply device in this embodiment, the power transmission and receipt of a high frequency wave electric power in the contactless manner are carried out by means of an electromagnetic induction action. In other words, when a voltage is applied to power transmitting coil 12, a magnetic coupling is generated between power transmitting coil 12 and power receiving coil 22 and an electric power is supplied from power transmitting coil 12 to power receiving coil 22.

Figure 2:
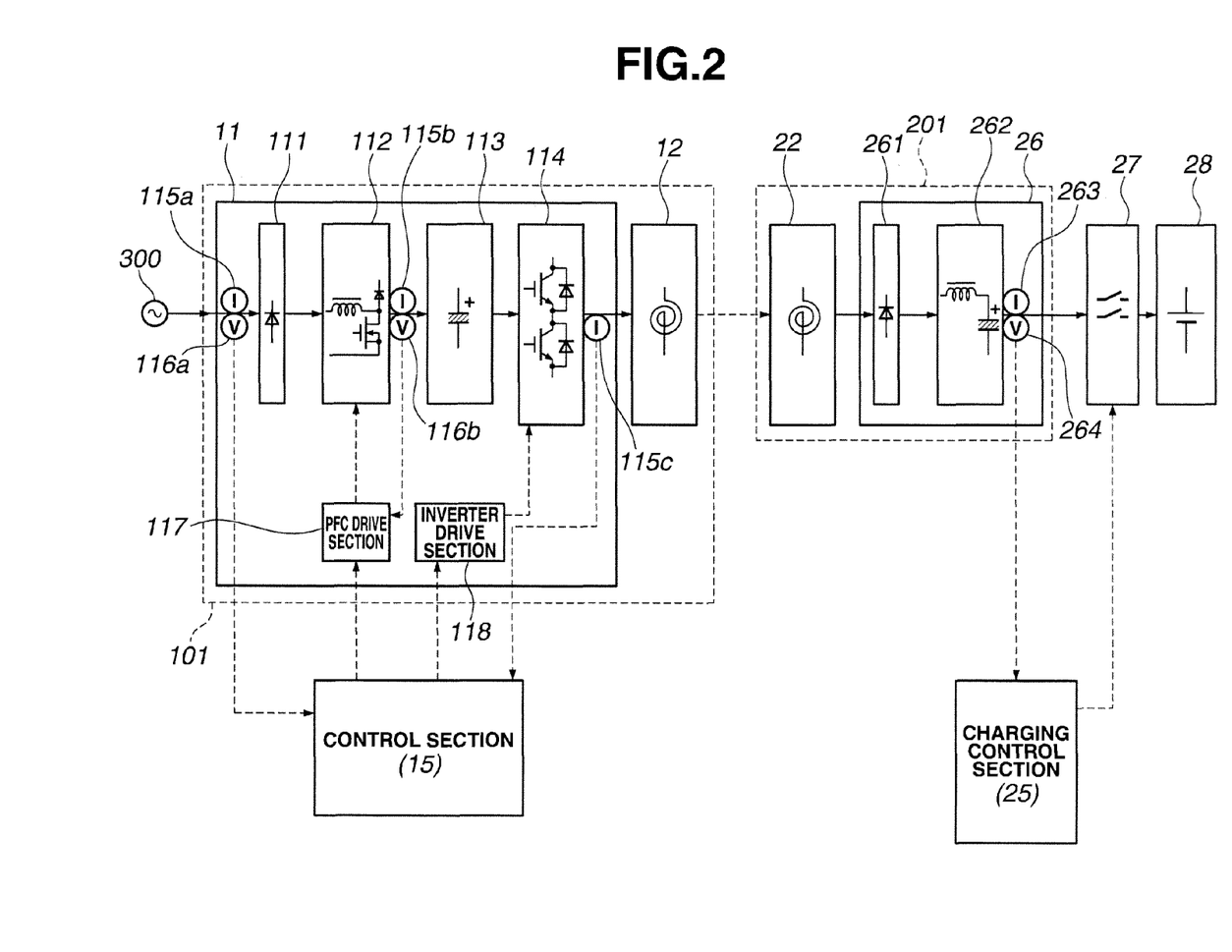
FIG. 2 is a block diagram of an alternating current power supply, a power transmitting circuit, a control section, a power receiving circuit, a relay section, a charging control section, and a battery included in the contactless charging system shown in FIG. 1.

Next, a specific structure related to the contactless power supply device will be described using FIG. 2.

Power transmitting circuit 101 includes: electric power control section 11; and power transmitting coil 12 and is connected to alternating current electric power supply 300. Charging circuit 201 includes: power receiving coil 22 and rectifying section 26 and is connected to battery 28 via relay section 27. It should be noted that no connection is made between power transmitting circuit 101 and charging circuit 201 in order to supply the electric power in the contactless manner between power transmitting coil 12 and power receiving coil 22.

Electric power control section 11 includes: a primary side rectifying section 111; a PFC (Power Factor Correction) circuit 112; a smoothing section 113; an inverter 114; current sensors 115a through 115c; voltage sensors 116a, 116b; a PFC drive section 117; and an inverter drive section 118.

Primary side rectifying section 111 is a circuit to rectify the alternating current electric power inputted from alternating current power supply 300 and is formed, for example, by a diode bridge circuit.

PFC circuit 112 is a circuit to improve a power factor by rectifying an output waveform from primary side rectifying section 111, is connected between rectifying section 111 and smoothing section 113, and is driven on a basis of a drive signal of PFC drive section 117.

Smoothing section 113 is, for example, constituted by a smoothing capacitor and is connected between PFC circuit 112 and inverter 114.

Inverter 114 is an electric power converting circuit including a PWM control circuit or so forth having switching elements such as IGBTs or so forth and converts a high frequency alternating current electric power by switching on and off the switching elements on a basis of the drive signal of inverter drive section 118 and supplies the alternating current electric power to power transmitting coil 12.

Current sensor 115a and voltage sensor 116a is connected between alternating current power supply 300 and primary side rectifying section 111 to detect a current and a voltage inputted from alternating current electric power supply 300.

Current sensor 115b and voltage sensor 116b are connected between PFC circuit 112 and smoothing circuit 113 to detect an electric current flowing between PFC circuit 112 and smoothing circuit 113 and a voltage between PFC circuit 112 and smoothing section 113, respectively. Current sensor 115c is connected to an output side of inverter 114 to detect an alternating current (AC) electric current supplied from inverter 115 to transmitting coil 12.

Thus, current sensors 115a through 115c detect current flowing into power transmitting circuit 110 and voltage sensors 116a, 116b detect voltage applied to power transmitting circuit 110.

Control section 15 controls PFC drive section 117 and performs the switching control for inverter drive section 118 on a basis of detected currents of current sensors 115a, 115c and detected voltage of voltage sensor 116a.

In addition, PFC drive section 117 controls PFC circuit 112 on a basis of the detected current of current sensor 115b and the detected voltage of voltage sensor 116b.

Rectifying circuit 26 includes: a secondary side rectifying section 261; a smoothing section 262; a current sensor 263; and a voltage sensor 264 and is a circuit to rectify an alternating current electric power received by power receiving coil 22 to a direct current electric power. Secondary side rectifying section 261 is a circuit to rectify the alternating current electric power outputted from receiving coil 22 and smoothing circuit 262 is a circuit to further eliminate alternating current components included in the output of secondary side rectifying section 261. Current sensor 263 detects an electric current outputted from smoothing section 262 to relay section 27. Voltage sensor 264 detects the output voltage of smoothing section 26.

Thus, current sensor 263 detects the current flowing through charging circuit 201 and voltage sensor 264 detects a voltage applied to charging circuit 201.

Next, contents of control by means of control section 15 and charging control section 25 will be described using FIGS. 1 and 2.

Control section 15 performs a system check to diagnose whether each system in power supply device 100 is normally operated as an initialization control.

Charging control section 25 performs a system check to diagnose whether the charging system of vehicle 200 operates normally as the initialization control in the same way as described above. As a result of the system checks, if vehicle 200 is determined that a system abnormality has occurred, the abnormality is informed to a user of vehicle 200 and, if charging device 100 is determined that the system abnormality has occurred, the abnormality is informed to a center or so forth which manages charging device 100.

On the other hand, in a case where the result of the system checks are determined to be normal, control section 15 activates wireless communication section 14 to be ready to receive the signals. It should be noted that the system checks at power supply device 100 side is carried out, for example, periodically at a predetermined frequency period and the system check at vehicle side 200 is carried out when, for example, a main switch to drive vehicle 200 is turned on.

Control section 15 and charging control section 25 control wireless communication section 14 and wireless communication section 24, respectively, and performs the following remote communication control.

First, charging control section 25 obtains the information on the present position of vehicle 200 from a GPS function installed in vehicle 200 to determine whether the present position of the vehicle falls in a charging point region preset. It should be noted that the charging point region is a range set in accordance with each of power supply devices 100 and is, for example, a range represented by a circle with the position of power supply device 100 as a center on a map. The fact that vehicle 200 is within the charging point region indicates that, when the charging is carried out for battery 28, the charging is carried out at one of charging devices 100 corresponding to the charging point region.

In a case where the present position of vehicle 200 is within the charging point region, charging control section activates wireless communication section 24 so that wireless communication section 14 is in a communicable state to wireless communication section 24. If wireless communication sections 14 and 24 are mutually communicable, charging control section 25 transmits a signal to establish a link from wireless communication section 24 to wireless communication section 14. In response to this, control section 15 returns back the signal to the effect that this signal is received from wireless communication section 14 to wireless communication section 24. Thus, the link is established between wireless communication section 14 and wireless communication section 24.

In addition, charging control section 25 transmits an ID of vehicle 200 to control section 15 through a communication between wireless communication section 14 and wireless communication section 24.

Control section 15 performs an ID authentication by determining whether an ID transmitted from vehicle side 200 is coincident with the ID previously registered into control section 15. In this contactless charging system, vehicle 200 which is a power supply acceptable is registered by ID for each of power supply devices 100. Hence, the power supply for one of vehicles 200 which is coincident with the registered ID can be made through the above-described ID authentication.

After the end of the link establishment and the ID authentication, charging control section 25 transmits the signal from wireless communication section 24 to wireless communication section 14 at the predetermined frequency period, while vehicle 200 approaches power supply device 100 corresponding to the charging point region and control section 15 measures a distance between vehicle 200 and power supply device 100. Wireless communication section 14 receives the signal periodically transmitted from wireless communication section 24. Distance measuring section 151 measures the distance between vehicle 200 and power supply device 100 from a signal electric field intensity of the received signal.

Control section 15 presets a threshold value to indicate that the distance between vehicle 200 and power supply device 100 approaches and the distance between the coils in a plane direction of power transmitting coil 12 and power receiving coil 22 becomes shorter as a vehicle approach threshold value.

Since an intensity of the received signal has a correlation to the distance between vehicle 200 and power supply device 100, in this embodiment, the vehicle approach threshold value is prescribed from the signal intensity.

Control section 15 compares the electric field intensity of the received signal with the vehicle approach threshold value to determine whether the distance between vehicle 200 and power supply device 100 is shorter than a predetermined distance. Then, if the distance between vehicle 200 and power supply device 100 becomes shorter than the predetermined distance, control section 15 estimates the power transmission efficiency at a power transmitting side during the traveling of the vehicle in the following procedure.

Next, using FIGS. 1, 3, and 4, a power transmission efficiency determination control by means of control section 15 will be described below.

It should be noted that, since control section 15 performs the power transmission efficiency determination control during the traveling of the vehicle, control is advanced with relay section 27 turned off.

First, control section 15 controls electric power control section 101 to transmit the electric power through a minute electric power to perform a trial power supply. The minute electric power is an electric power lower than the power transmission at a time of a normal (regular) power supply and lower than the electric power required to charge battery 28.

At the time of a start of the trial power supply, the distance between vehicle 200 and power supply device 100 is shorter than the predetermined distance as described above. However, the distance between power transmitting coil 12 and power receiving coil 22 becomes is long as compared with the distance in order for power transmitting coil 12 to be enabled to transmit the electric power to power receiving coil 22 and power transmitting coil 12 is not in a mutually opposed position to power receiving coil 22.

Hence, an impedance between power transmitting coil 12 and power receiving coil 22 indicates high so that an input electric power of power transmitting circuit 101 to an electric power set in the trial power supply by means of control section 15 becomes lower. At this time, since, in charging circuit 262 which is the power receiving side, relay section 27 is turned off so that the current is not detected by means of current sensor 263 and the received electric power cannot be measured.

Then, as the distance between power transmitting coil 12 and power receiving coil 22 is made short due to a movement of vehicle 200, the impedance between power transmitting coil 12 and power receiving coil 22 is decreased. Hence, the input electric power at power transmitting coil 101 becomes high.

Figure 3:
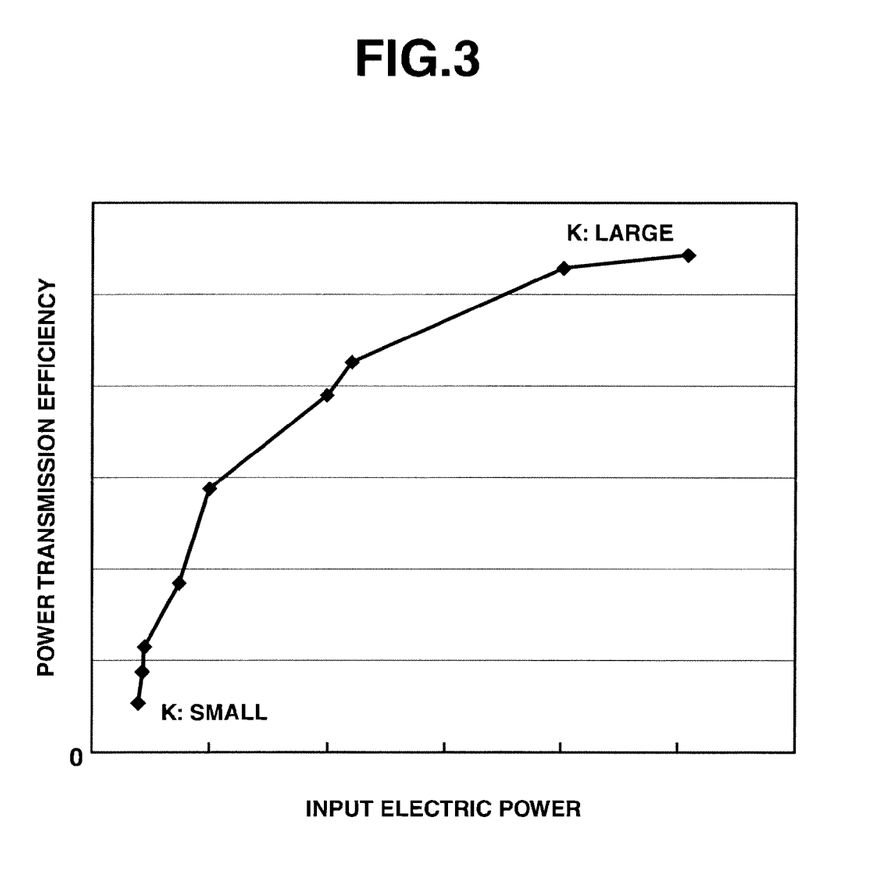
FIG. 3 is a graph representing a correspondence of the power transmission efficiency to an input electric power included in the contactless charging system shown in FIG. 1.
Figure 4:
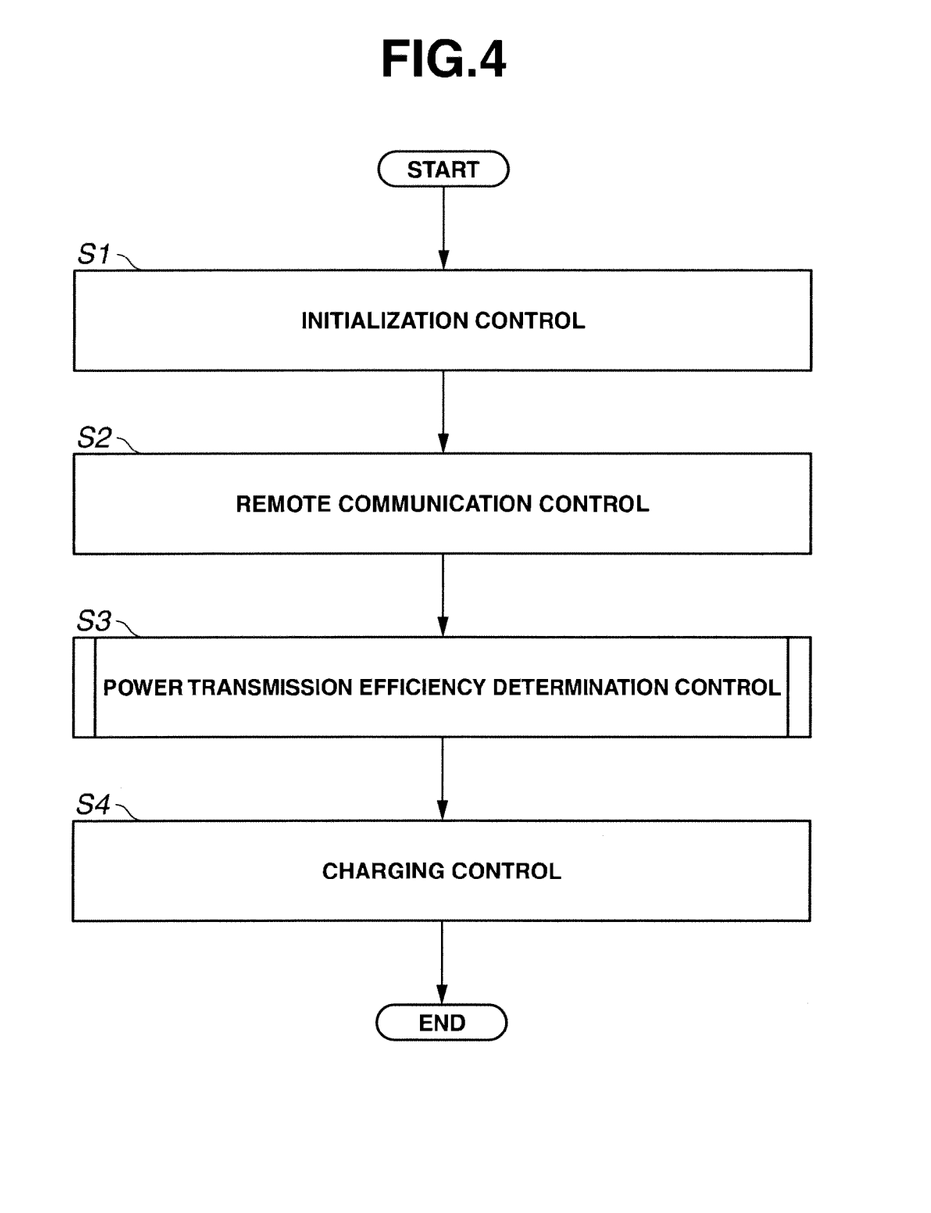
FIG. 4 is a flowchart representing a control procedure of a contactless power supply device included in the contactless charging system shown in FIG. 1.

FIG. 3 shows a graph representing a characteristic of the power transmission efficiency to the input power of power transmitting circuit 101. In FIG. 3, K denotes a coupling coefficient between power transmitting coil 12 and power receiving coil 22. The power transmission efficiency indicates an electric power efficiency to transmit the electric power from power transmitting coil 12 to power receiving coil 22.

As shown in FIG. 3, a correlation between the input electric power and the power transmission efficiency is provided so that, in a case where the input electric power in power transmission circuit 101 is high, the power transmission efficiency can be estimated to be high.

In addition, if the distance between power transmitting coil 12 and power receiving coil 22 becomes shorter, the coupling coefficient (K) becomes high and the power transmission efficiency becomes high.

Therefore, the distance between power transmitting coil 12 and power receiving coil 22 can be estimated from the input electric power and, in other words, a relative position of power receiving coil 22 to the position of power transmitting coil 12 can be estimated.

In this embodiment, during a time at which a trial power supply is carried out, alternating current power supply 300 inputs the electric power to power transmitting circuit 101 at a constant frequency and at a constant voltage. Hence, control section 15 measures the input electric power of power transmitting circuit 101 from the detected electric current of current sensor 115*a* and estimates the power transmission efficiency from the measured input electric power through power transmission efficiency estimating section 151.

Current sensor 115*a* detects the electric current at a predetermined sampling period at the time of the trial power supply and during the traveling of vehicle 200 and outputs the detection result to control section 15.

A power transmission electric power of power transmitting circuit 101 can be measured using the detection current of current sensor 115*b* although not necessarily using the detection current of current sensor 115*a*. However, since the frequency of the current inputted to primary side rectifying section 111 is the lowest in power transmitting circuit 101.

Therefore, in this embodiment, the input electric power is measured using the detection current of current sensor 115*b*.

Then, power transmission efficiency estimating section 151 estimates the higher power transmission efficiency as the measured input electric power becomes higher.

In addition, control section 15 determines whether the positional deviation between power transmitting coil 12 and power receiving coil 22 falls within the range in which battery 28 is chargeable on a basis of the detection current of current sensor 115*a*.

Position determining section 152 sets a threshold current chargeable in battery 28 and corresponding to an allowance range of the positional deviation between the coils.

As described above, since, during the trail power supply, the voltage inputted to power transmission circuit 101 is constant, a magnitude of the detected current corresponds to the magnitude of the measured input electric power. Then, since the magnitude of the input electric power is correlated to the magnitude of the positional deviation between the coils, as the detection current becomes larger, the positional deviation between power transmitting coil 12 and power receiving coil 22 becomes smaller.

In a case where the positional deviation between power transmitting coil 12 and power receiving coil 22 is large, the coupling coefficient between the coils is low and the power transmission efficiency is accordingly low. Hence, at the power receiving side, the electric power chargeable in battery 28 cannot be received. Hence, in this embodiment, the positional deviation between the coils at which battery 28 is chargeable is preset and the current value corresponding to the preset positional deviation is set as the threshold current.

Position determining section 152 determines that, in a case where the detected current is higher than the threshold current on a basis of the detected current of current sensor 115*a* outputted at the predetermined sampling period during the traveling of vehicle 200, the positional deviation between power transmitting coil 12 and power receiving coil 22 is determined to fall within the range in which battery 28 is chargeable and it is determined to be out of the range in which battery 28 is chargeable in a case where the detected current is lower than the threshold current.

If position determining section 152 determines that the positional deviation between power transmitting coil 12 and power receiving coil 22 falls within the range in which battery 28 is chargeable, control section 15 transmits the signal indicating that the positional deviation between the coils falls in the range in which the battery is chargeable through wireless communication section 14 to finish the trial power supply. Then, position determining section 152 compares the detected current of current sensor 115*a* and the threshold current value to determine whether the power transmission efficiency estimated by power transmission efficiency estimating section 151 is higher than an allowance electrical power threshold value corresponding to the threshold current. Then, if the estimated power transmission efficiency is determined to be higher than the allowable electric power threshold value and the positional deviation between the coils is determined to fall within the range in which the battery is chargeable, control section 15 informs the effect that the charging is allowed through the wireless communication to vehicle 200 side.

Next, the following charging control is carried out is by control section 15 and charging control section 25 after the above-described power transmission efficiency determination control.

When charging control section 25 receives the signal indicating that the positional deviation between the coils falls in the range in which the battery is chargeable through wireless communication section 24, charging control section 25 informs the effect that the charging is allowed to the user via informing section 31.

Then, the user, upon confirmation of the information from informing section 31, recognizes that power receiving coil 22 is positioned at an appropriate position with respect to the position of power transmitting coil 12 and stops vehicle 200.

When the user performs an operation to start the charging, charging control section 25 turns on relay section 27 and transmits the signal to the effect that the charging is started to power supply device 100.

Control section 15 sets the electric power charging battery 28, controls electric power control section 11, and starts the power supply from power transmitting coil 12 to power receiving coil 22 when the signal described above is received.

Charging control section 25 manages the charged state of battery 28 (SOC) and transmits the signal to the effect that battery 28 has fully charged to power supply device 100 when battery 28 has reached to the fully charged state. Then, charging control section 25 turns off relay section 27 to complete the charging control.

Control section 15 ends the power supply on a basis of the signal indicating the end of the charging transmitted to charging control section 25.

Figure 5:
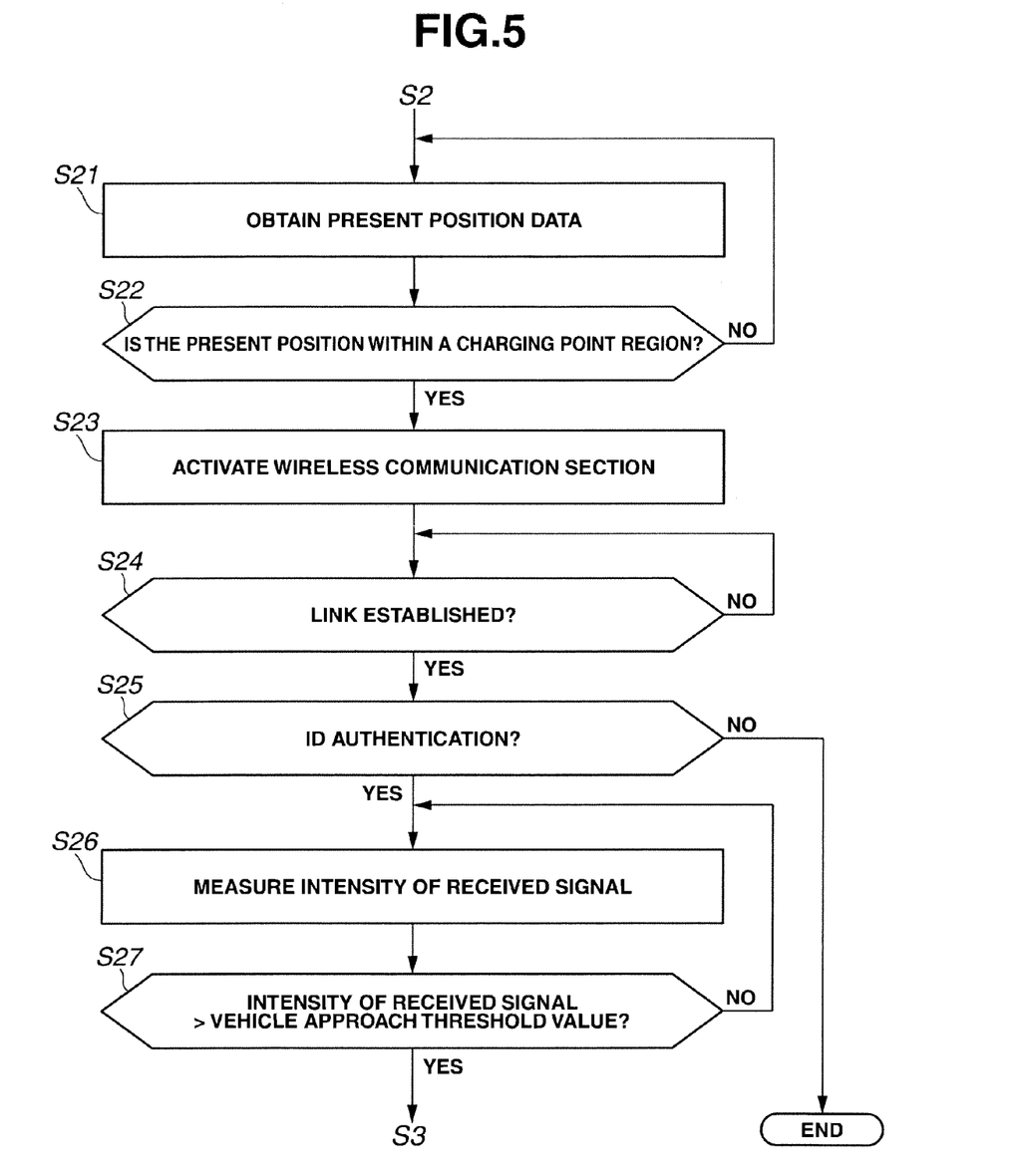
FIG. 5 is a flowchart representing a control procedure of a remote communication control in FIG. 4.
Figure 6:
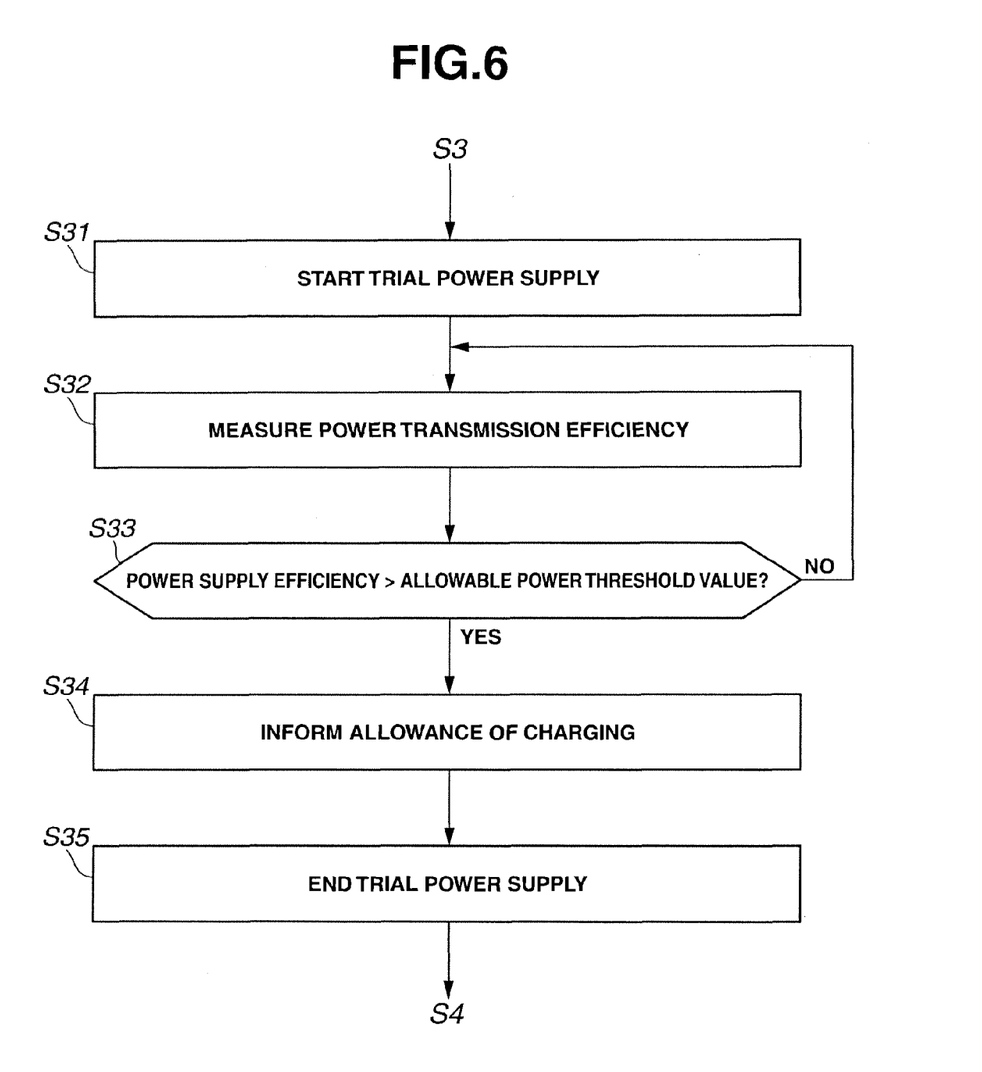
FIG. 6 is a flowchart representing a control procedure of a power transmission efficiency determination control in FIG. 4.

Next, a control procedure of the contactless charging system in this embodiment will be described using FIGS. 4 through 6. FIG. 4 shows a flowchart representing the control procedure of the contactless charging system in this embodiment, FIG. 5 shows a flowchart representing the control procedure representing a remote communication control in FIG. 4, and FIG. 6 shows a flowchart representing the control procedure of a power transmission efficiency determination control. It should be noted that from among control flows, the controls carried out by control section 15 side are carried out under a control of a sequence control section 153. It should be noted that the controls of steps S1 through S3 are carried out during the movement of vehicle 200 and, hence, during this control, relay section 27 is in the off state.

At step S1, control section 15 and charging control section 25 perform the system checks as the initialization control. At step S2, control section 15 and charging control section 25 perform the remote communication control.

The remote communication control at step S2 will be described below. As shown in FIG. 7, at a step S21, charging control section 25 obtains a present position of vehicle 200 through a GPS function of the controller not shown. At a step S22, charging control section 25 determines whether the obtained present position is within the charging point region of any one of power supply devices 100.

If the obtained present position is not within the charging point region, the routine returns to step S21. If the present position is within the charging point region, the routine goes to a step S23. At step S23, charging control section 25 activates wireless communication section 24.

At a step S24, control section 15 and charging control section 25 transmit and receive the signal to establish the link between wireless communication section 14 and wireless communication section 24 to determine whether the link is established.

In a case where the link is not established, the routine returns to step S24 and the signal is transmitted and received between wireless communication section 14 and wireless communication section 24.

If the link is established, the routine goes to a step S25 at which charging control section 25 transmits the ID of vehicle 200 to corresponding power supply device 100. Control section 15 performs the ID authentication by collating the ID included in vehicle 200 to power supply device 100 with ID registered in corresponding power supply device 100.

If the ID is not authenticated, the control in this embodiment is ended. On the other hand, in a case where the ID is authenticated, at a step S26, charging control section 25 transmits the signal at a predetermined frequency period from wireless communication section 24. Control section 15 measures an electric field intensity of the received signal at wireless communication section 14 to measure the distance between vehicle 200 and corresponding power supply device 100.

At a step S27, control section 15 determines whether the electric field intensity of the received signal is larger than the vehicle approach threshold value. In a case where the electric field strength of the received signal is equal to or below the vehicle approach threshold value, control section 15 determines that vehicle 200 does not approach power supply device 100 and the routine returns to step S26. On the other hand, in a case where the electric field strength of the received signal is larger than the vehicle approach threshold value, control section 15 determines that vehicle 200 approaches power supply device 100 and the routine returns to step S3 to end the remote communication control of step S2.

The power transmission efficiency determination control at step S3 will be described below. As shown in FIG. 6, at a step S31, the trial power supply is started by control section 15 during a movement of vehicle 200.

At a step S32, power transmission efficiency estimating section 151 measures the input electric power and estimates the power transmission efficiency on a basis of the detected current of current sensor 115*a*.

At a step S33, position determining section 152 compares the detected voltage of current sensor 115*a* with the threshold current to determine whether the estimated power transmission efficiency is higher than an allowable electric power threshold value.

In a case where the estimated power transmission efficiency is equal to or below the allowable electrical power threshold value, the routine returns to step S32 and the power transmission efficiency is again estimated.

On the other hand, in a case where the estimated power transmission efficiency is higher than the allowable electric power threshold value, the routine goes to a step S34. Thus, in a case where the positional deviation between power transmitting coil 12 and power receiving coil 22 is out of the range in which the battery is chargeable, the controls of steps S32 and S33 are repeated. When vehicle 200 is further moved, the distance between power transmitting coil 12 and power receiving coil 22 becomes shorter. If the positional deviation is within an allowable range, the control loop of steps S32 and S33 is escaped.

At step S34, control section 15 transmits the signal that the charging is allowed to vehicle 200 and charging control section 25 informs that the charging is allowed through informing section 31 on a basis of the signal. At a step S35, control section 15 ends the trial power supply and the routine returns to step S4.

When the power transmission efficiency control is ended, the user stops vehicle 200 and charging control section 25 turns on relay section 27 on a basis of an operation to start the charging through the user.

Control section 15 sets the electric power for the normal charging and performs the power supply from power transmitting coil 12 to power receiving coil 22. Battery 28 is charged through the received electric power of power receiving coil 22 and, when battery 28 is in the full charge state, charging control section 25 ends the charging on a basis of the signal to the effect that battery 28 is in the full charge state.

As described above, in this embodiment, the power transmission efficiency from power transmitting coil 12 to power receiving coil 22 is estimated on a basis of a detected value of the current flowing into power transmitting circuit 101 through current sensor 115a. Thus, even if the circuit at the power receiving side is in the state in which no conduction occurs, the power transmission efficiency can be detected at the power transmitting side.

In addition, in this embodiment, relay section 27 is provided and relay section 27 is turned off during the traveling of the vehicle. Thus, during the vehicle traveling, even if battery 28 and charging circuit 201 are interrupted (not in an electrically connected state to each other), the power transmission efficiency can be detected at the power transmitting side.

In addition, in this embodiment, the power transmission efficiency is estimated during the vehicle traveling. Thus, even if the circuits at the power receiving side are not in the electrical conduction state during the traveling of the vehicle, the power transmission efficiency is detected during the vehicle traveling. Hence, the coupling coefficient between the coils and the distance between the coils can be grasped during the vehicle traveling which have a correlation to the power transmission efficiency.

In addition, in this embodiment, in a case where the power transmission efficiency estimated by power transmission efficiency estimating section 151 is higher than the allowable electric power threshold value, charging control section 25 determines that the positional deviation between power transmitting coil 12 and power receiving coil 22 is within the range in which battery 28 is chargeable. Thus, even if the circuit at the power receiving side is in the non electric conduction state, the transmitting side can detect the positional deviation between power transmitting coil 12 and power receiving coil 22. In addition, during the traveling of the vehicle, the positional deviation can be detected between power transmitting coil 12 and power receiving coil 22. In addition, another sensor to detect the positional deviation between power transmitting coil 12 and power receiving coil 22 can be omitted.

In addition, in this embodiment, a determination result by position detecting section 152 is informed through informing section 31. Thus, whether the positional deviation between power transmitting coil 12 and power receiving coil 22 is within the range in which battery 28 is chargeable can be confirmed by means of the information through informing section 31. Thus, for example, when vehicle 200 is parked at the predetermined parking space, the information is confirmed so that the confirmation of whether the positioning between power transmitting coil 12 and power receiving coil 22 is carried out at the position suitable for the charging of battery 28 can be made.

It should be noted that, in this embodiment, with the voltage inputted to power transmitting circuit 101 made constant, the power transmission efficiency is estimated from current sensor 115a. However, with the input electric power measured from the detected voltages of voltage sensors 116a, 116b, the power transmission efficiency may be estimated. In addition, the input electric power may be measured from the detected currents of current sensors 115a through 115c and the detected voltages of voltage sensors 116a, 116b, with the input current and input voltage of power transmitting circuit 101 not made constant, to estimate the power transmission efficiency.

In addition, in this embodiment, the positional deviation between power transmitting coil 12 and power receiving coil 22 is detected from the power transmission efficiency estimated by power transmission efficiency estimating section 151. However, another sensor to detect the positional deviation between power transmitting coil 12 and power receiving coil 22 is is additionally installed so that the position of each of the coils may be detected from the output of this sensor. Then, position determining section 152 may detect the positional deviation between the coils from the power transmission efficiency estimated by power transmission efficiency estimating section 151, in a case where the other sensor described above cannot normally detect the position due to some cause.

When the positional deviation between the coils is detected, the positional deviation in the plane direction of the coil surface of power transmitting coil 12 or power receiving coil 22 may be detected by position determining section 152 on a basis of the estimated power transmission efficiency and the positional deviation in a vertical direction to the coil surface may be detected by a still another sensor of detecting the positional deviation. Thus, the structure of the position sensors to detect the positional deviation between the coils can be simplified.

It should be noted that, in this embodiment, informing section 31 is installed in vehicle side 200 but may be installed in power supply device side 100 which is on the earth side.

Above-described power transmitting coil 12 corresponds to a first coil according to the present invention, power receiving coil 22 corresponds to a second coil, current sensors 115a, 115b and voltage sensors 116a, 116b correspond to a sensor according to the present invention, power transmission efficiency estimating section 151 corresponds to power transmission efficiency estimating means according to the present invention, relay section 27 corresponds to switching means according to the present invention, position determining section 152 is corresponds to determining means according to the present invention, and informing section 31 corresponds to informing means according to the present invention.

The invention claimed is:

1. A contactless power supply device for transmitting an electric power from a first coil to a second coil in a contactless manner by at least a magnetic coupling, comprising:
   a power transmitting circuit including the first coil;
   a sensor configured to measure a current flowing through the power transmitting circuit or to measure a voltage applied to the power transmitting circuit;
   a battery providing a power source of a vehicle;
   a charging circuit including the second coil and configured to charge the battery;
   an informing device; and
   a control section in communication with the sensor, the control section being configured to:
      determine an input electric power of the power transmitting circuit from at least either one of values from a detected current or a detected voltage detected by the sensor;
      estimate a power transmission efficiency from the first coil to the second coil on a basis of a correlation between the power transmission efficiency from the first coil to the second coil and the input electric power such that as the input electric power becomes higher, the estimated power transmission efficiency becomes higher;
      determine that a positional deviation between the first coil and the second coil falls in a range in which the battery is chargeable, in a case where the power transmission efficiency estimated by the control section is higher than a predetermined value;
      based on the determination that the positional deviation falls in the range in which the battery is chargeable, control the informing device to indicate that the charging is allowed; and
      in response to the indication that the charging is allowed, enable a user of the vehicle to confirm via the informing device that the control section controls the charging circuit to charge the battery.

2. The contactless power supply device as claimed in claim 1, further comprising a switch connected between the battery and the charging circuit wherein the switch is in an off state during a traveling of the vehicle.

3. The contactless power supply device as claimed in claim 1, wherein the control section is further configured to estimate the power transmission efficiency during a traveling of the vehicle.

4. The contactless power supply device as claimed in claim 1, wherein a trial power supply to supply the electric power through a minute electric power is carried out and, while the trial power supply is carried out, the estimation of the power transmission efficiency is carried out.

5. The contactless power supply device as claimed in claim 1, wherein, when a distance between the vehicle and the first coil becomes shorter than a predetermined distance, a trial power supply to supply electric power through a minute electric power is carried out and, while the trial power supply is carried out, the estimation of the power transmission efficiency is carried out.

6. A contactless power supply device for transmitting an electric power from a first coil to a second coil in a contactless manner by at least a magnetic coupling, comprising:
   a power transmitting circuit including the first coil;
   a sensor configured to measure a current flowing through the power transmitting circuit or to measure a voltage applied to the power transmitting circuit;
   a battery providing a power source of a vehicle;
   a charging circuit including the second coil and configured to charge the battery;
   an informing device; and
   a controller in communication with the sensor, the controller being configured to:
      determine an input electric power of the power transmitting circuit from at least either one of values from a detected current or a detected voltage detected by the sensor;
      estimate a power transmission efficiency from the first coil to the second coil on a basis of a correlation between the power transmission efficiency from the first coil to the second coil and the input electric power such that as the input electric power becomes higher, the estimated power transmission efficiency becomes higher;
      determine that a positional deviation between the first coil and the second coil falls in a range in which the battery is chargeable, in a case where the power transmission efficiency estimated by the controller is higher than a predetermined value;
      based on the determination that the positional deviation falls in the range in which the battery is chargeable, control the informing device to indicate that the charging is allowed; and
      in response to the indication that the charging is allowed, enable a user of the vehicle to confirm via the informing device that the controller controls the charging circuit to charge the battery.

* * * * *